May 14, 1935. M. SCHMIDT 2,000,993
AXLE AND WHEEL ALIGNER
Filed July 14, 1932 4 Sheets-Sheet 1
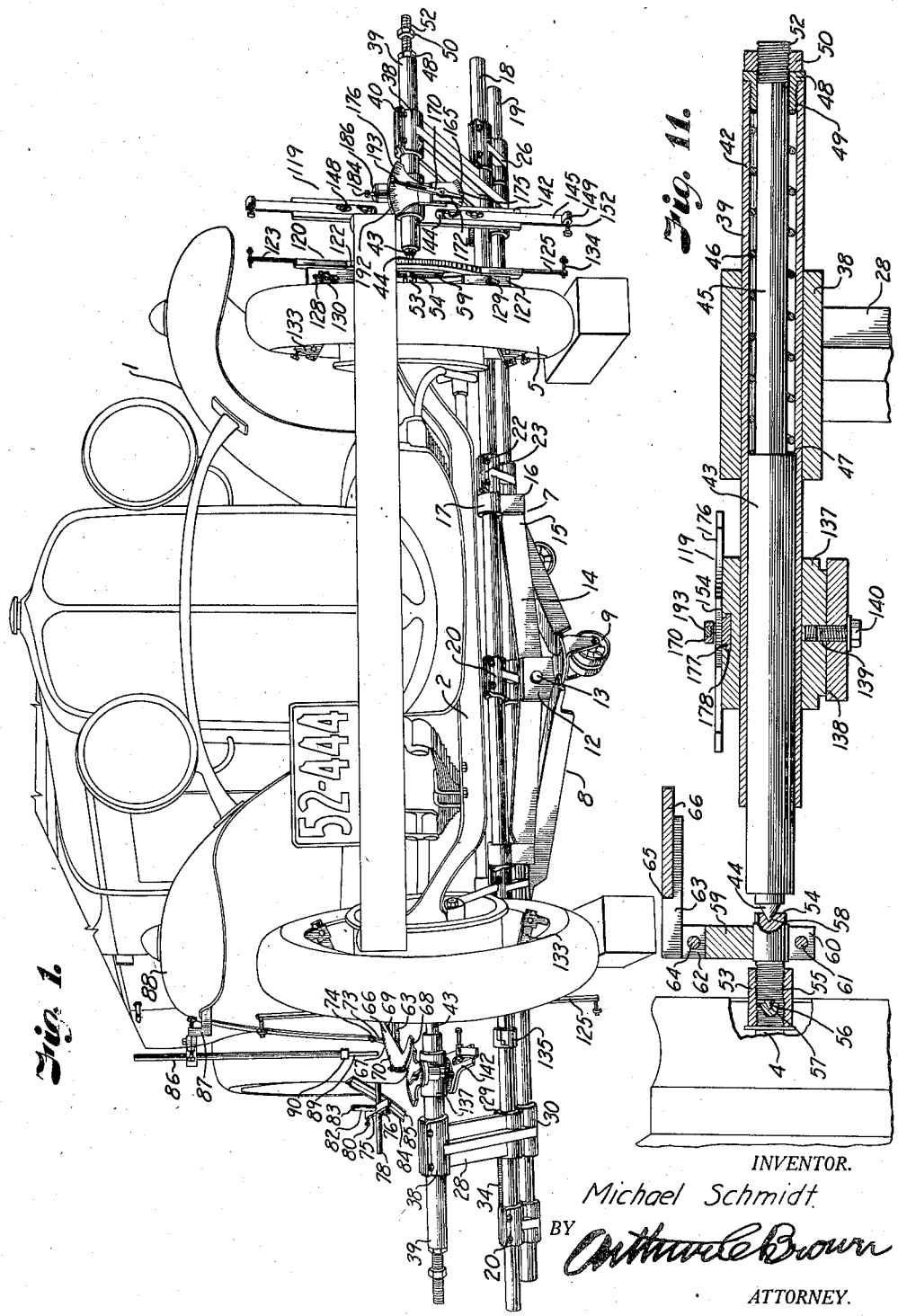
INVENTOR.
Michael Schmidt
BY
ATTORNEY.

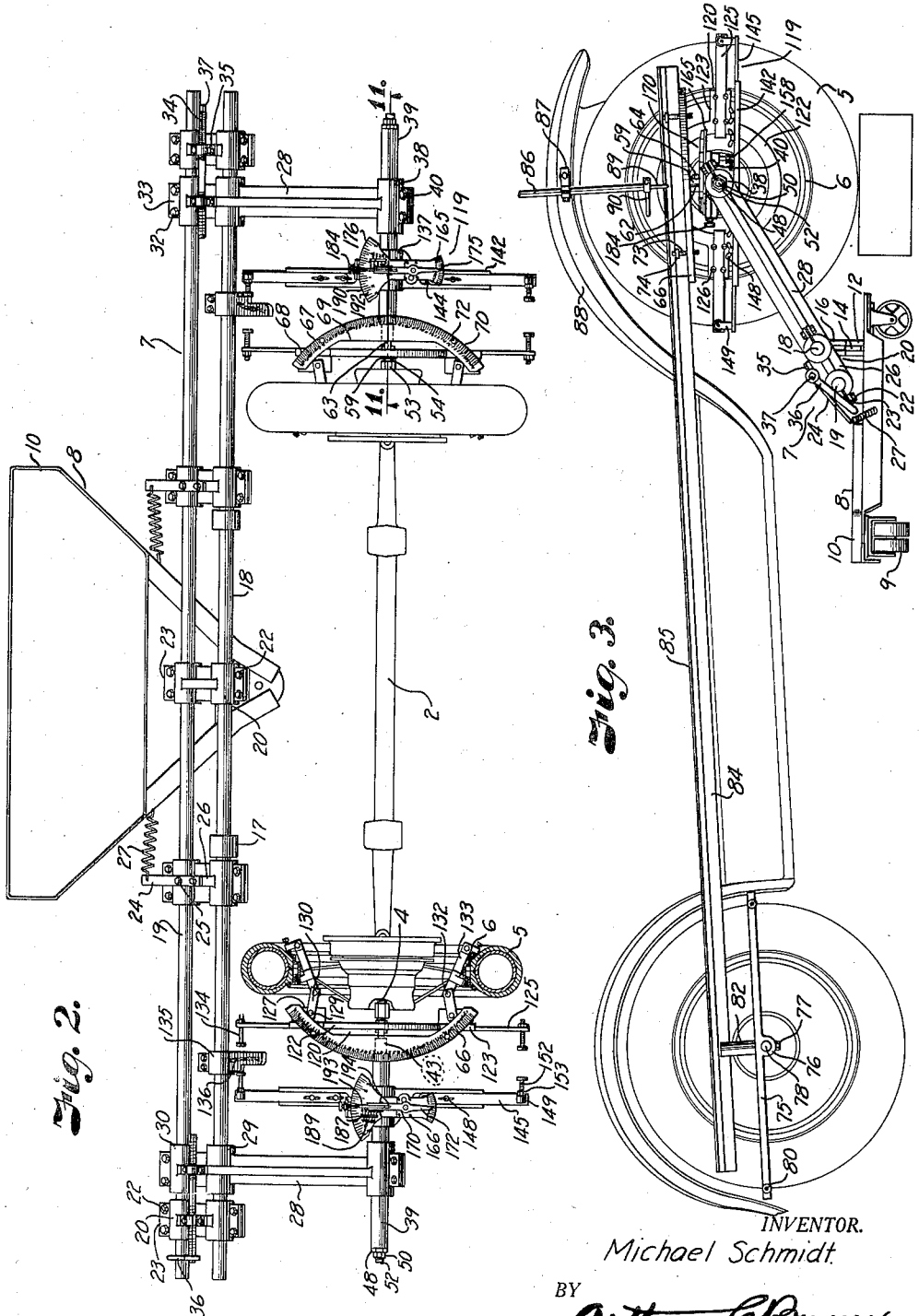

May 14, 1935.  M. SCHMIDT  2,000,993
AXLE AND WHEEL ALIGNER
Filed July 14, 1932     4 Sheets-Sheet 3

INVENTOR.
Michael Schmidt.
BY Arthur C. Brown
ATTORNEY.

May 14, 1935. M. SCHMIDT 2,000,993
AXLE AND WHEEL ALIGNER
Filed July 14, 1932 4 Sheets-Sheet 4
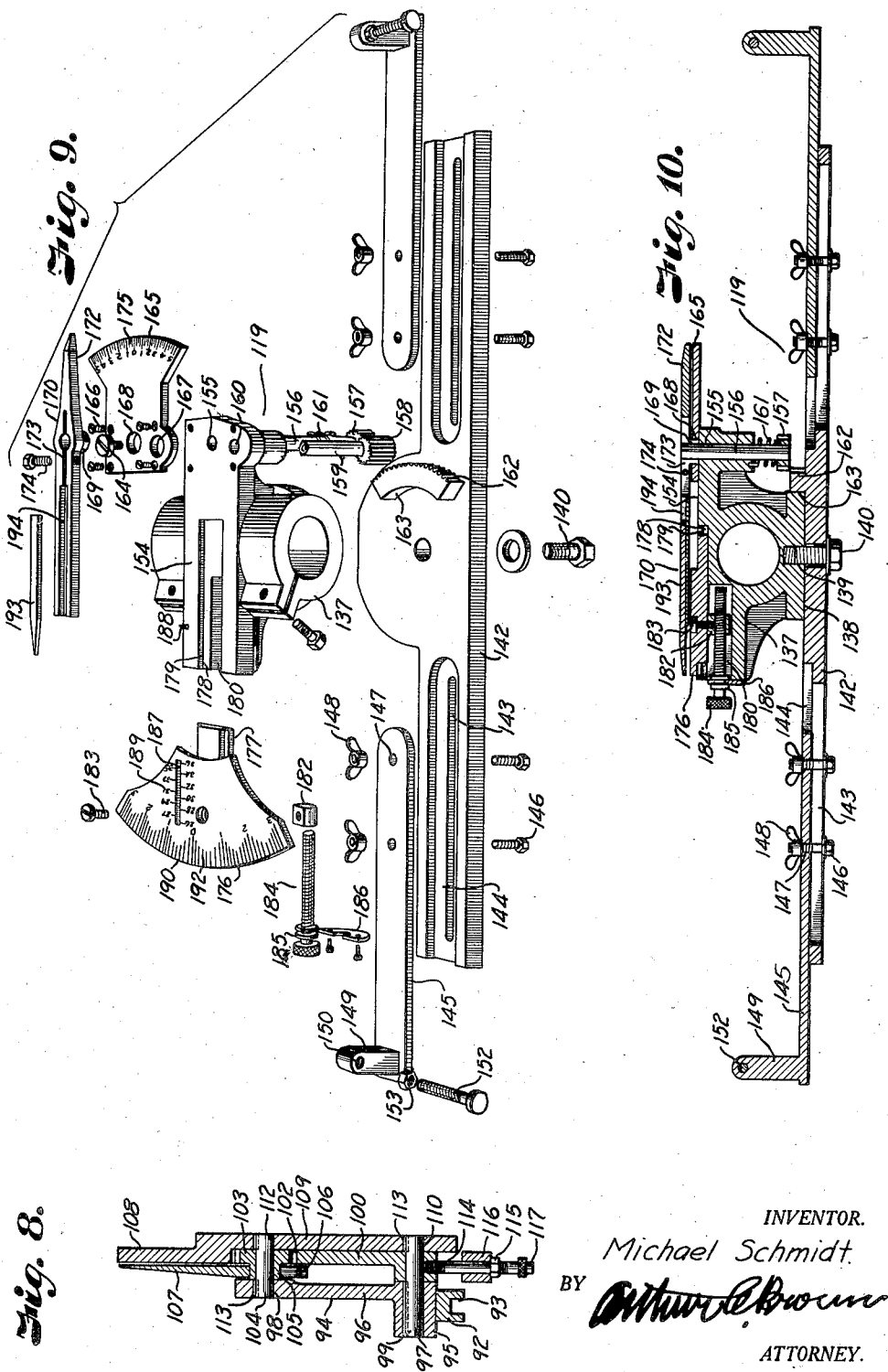
INVENTOR.
Michael Schmidt
BY
ATTORNEY.

Patented May 14, 1935

2,000,993

UNITED STATES PATENT OFFICE 2,000,993

AXLE AND WHEEL ALIGNER

Michael Schmidt, Junction City, Kans., assignor of one-half to C. W. Wilson, Kansas City, Mo.

Application July 14, 1932, Serial No. 622,443

6 Claims. (Cl. 33—203)

My invention relates to measuring or gauging apparatus and more particularly to a machine of that character for gauging the accuracy of wheel and axle alignments of vehicles.

Particularly in the case of the front or steering wheels of an automobile, truck, or the like, it is imperative that the various cardinal positions of the wheels relative to each other, or to the vehicle as determined at the factory for most efficient operation should be maintained throughout the life of the vehicle.

Unless the practice is followed of having such alignments periodically checked and more especially to have thorough tests made after accidents or excessive road shocks, rapid wear of the tires and steering mechanism is apt to follow and possibility of such serious misalignment of parts as to eventually cause an accident is likely to be present.

The cardinal positions or adjustments for which wheels are tested are commonly characterized as camber or pitch, toe-in, caster angle and turning radius, and while various machines have heretofore been devised for ascertaining the accuracy of one or more of these positions, those of which I am aware do not embody means for checking all of the adjustments.

It is, therefore, the principal object of my invention to provide a machine whereby every position of the wheel, as above characterized, and the alignment of other members of a vehicle can be readily and accurately tested so that proper adjustment of these members, as intended by the manufacturer, is assured.

A further object of the invention is to provide a gauging apparatus that can be securely connected in operable relation with the front or rear axle of a car without requiring alterations of the vehicle and wherewith every necessary test for misalignment of members can be made without requiring disconnection of the apparatus from the vehicle.

Another object of the invention is to provide an aligning machine which, when connected in functional position on the front end of a vehicle, will allow ample space for performing bending and like operations on the front axle.

In accomplishing these and other objects of my invention, I have provided improved details of structure, the preferred form of which is illustrated in the accompanying drawings, wherein:

Fig. 1 is a perspective view of an automobile with wheel aligning apparatus embodying my invention shown associated therewith in functional relation.

Fig. 2 is a plan view of the aligning machine applied to the front wheels of a vehicle, one of the wheels being shown in cross section.

Fig. 3 is a side elevational view illustrating the process of aligning a table member to parallel relation with a line extending from the center of the rear to the center of the front wheel spindle.

Fig. 8 is a cross sectional view of indicating mechanism for the turning radius and caster angle assembly.

Fig. 9 is a perspective view of members of the camber and toe-in testing apparatus shown in disassembled but related condition.

Fig. 10 is a longitudinal central section showing the parts of Fig. 9 in assembled condition.

Fig. 11 is a sectional view on the line 11—11, Fig. 2.

Figure 4:
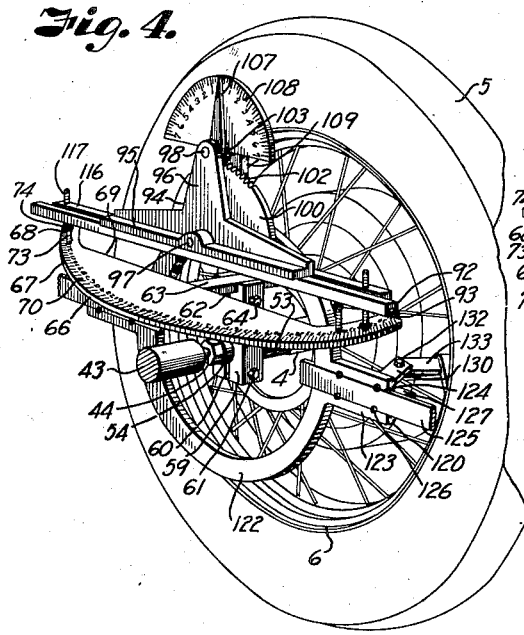
Fig. 4 is a perspective view of the turning radius and caster angle assembly mounted on a wheel and disclosing the initial position of the members when testing a front axle for caster angle.

Referring more in detail to the drawings:

1 designates an automobile including front and rear axles 2 and 3, wheel spindles 4 on the front axle, and front wheels 5 mounted on the spindles and having the usual rims 6.

My apparatus for aligning various members of a vehicle including particularly the front axle 2, the spindles 4 and the front wheels 5, comprises an assembly generally designated 7 supported on a truck or dolly 8, preferably triangular in shape, as particularly shown in Fig. 2. The frame of the truck may be constructed of any material suitable for supplying the necessary strength and is movably mounted on casters 9, a container or pan 10 being preferably provided on the upper face of the frame for receiving tools used in making the necessary adjustments.

The converging end of the frame is provided with a bracket 12 through which a rocker pin 13 is transversely extended for pivotally supporting a trunnion bar 14 centrally mounted on the pin and having end portions 15 extending parallel to the rear edge of the truck. The ends of the trunnion bar incline upwardly and fixed on their extreme outer ends are trunnion brackets 16 having aligned bearing portions 17 for receiving a longitudinal shaft 18 of such length as to extend considerably beyond the sides of the vehicle when positioned transversely thereunder.

A second longitudinal shaft 19, parallel to the shaft 18, is rigidly connected therewith by brackets 20 arranged at spaced intervals along the shafts as best shown in Fig. 2. The brackets preferably include split sleeves clamped on the shafts by bolts 22 extended through end flanges 23 of the sleeves to securely connect the shafts.

Provided on the brackets adjacent the sides of the truck are arms 24 secured as by bolts 25 threaded into rib portions 26 of the brackets and having opposite ends anchored by springs 27 to the truck thereby serving to maintain a substantial balance of the shafts and equipment mounted thereon as will later be apparent.

Slidably mounted on the shafts adjacent the inner ends of the outer brackets 20 are arms 28 provided at one end with bearing portions 29 and 30 for respectively receiving the shafts 18 and 19 and split similarly to the brackets 20 so that the bearing portions may be drawn to snug engagement with the shafts by bolts 32 extended through the flanges 33 of the portions 30.

It is desirable to adjust the arms longitudinally on the shafts in order to adapt the apparatus to vehicles of different width and for this purpose, an adjusting screw 34 is threadedly engaged with a bearing nut 35 secured to the rib 26 of the clamping bracket and with a similar nut on a corresponding rib of the arm, the end of the screw engaging one rib being threaded oppositely to that engaging the other rib, so that rotation of the screw by means such as a wrench 36 mounted on the outer squared end 37 of the screw will move the arm longitudinally on the shafts. Provided on the ends of arms 28 opposite the parallel shafts are bearing portions 38 for each receiving a support or trunnion bar 39 in parallel relation to the paired shafts, the bearing 38 being also split and provided with bolts 40 for clamping the arm to the spindle in longitudinally adjusted position.

The trunnion bar preferably comprises a sleeve 42 for slidably receiving a trunnion or shaft 43 terminating at one end in a bearing point 44 and provided at its opposite end with a reduced portion 45 to reserve a space within the sleeve for seating a spring 46 having one end engaging a shoulder 47 formed by reducing the end of the spindle, and its opposite end bearing against a guide nut 48 threaded into the outer end of the sleeve as indicated at 49. The spring thus serves to urge the spindle outwardly from the inner end of the sleeve but such movement is limited by a nut 50 threaded on the extreme outer end 52 of the reduced portion 45.

In order to operably connect the trunnion 43 with the wheel spindle 4, when it is desired to employ apparatus for determining the turning radius and caster of the wheels, a collar 53 is threaded on the wheel spindle and an extension stud 54 is provided at one end with a threaded portion 55 engaging the collar and terminating in a bearing point 56 adapted to seat in a lathe center or bearing 57 at the central terminus of the wheel spindle to insure concentric alignment of the stud and spindle. The opposite unthreaded end of the stud is provided with a bearing socket 58 for seating the bearing end 44 of the shaft 43 thereby tending to hold these members in axial alignment.

The spring actuated trunnions 43 compensate for varying distances between spindle centers when the wheels are turned in either direction away from straight ahead, and also prevent accidental detachment of the aligning machine from the vehicle due to variations in these distances.

The apparatus thus far described, when operably connected with a pair of wheel spindles, serves as a common support for the various testing-mechanisms and the axes of the trunnions constitute a base line from which angularity of the spindles is determined now to be successively referred to in detail.

Inasmuch as the turning radius is commonly the first test made, the apparatus for accomplishing this purpose will first be described and includes a clamp 59 mounted on each spindle extension stud and preferably having a lower slotted end 60 clamped to the stud by a cross bolt 61.

The upper end of the clamp is likewise slotted as shown at 62 to provide a recess for adjustably receiving a lateral arm 63 clamped therein by a bolt 64 extending transversely through the slot. The projecting end of the arm is preferably recessed as at 65 for seating a plate or table 66 secured in any suitable manner thereto and having an arcuate outer edge 67 continuing along wings 68 extended beyond the inner edge 69 of the table. To simplify the process of testing the turning radius the table is calibrated along its arcuate edge as shown at 70, the calibrations being numbered in successive order from zero at the center of the table toward each wing.

Provided in the extended portions of the table as clearly shown in Fig. 2, are openings 72 spaced equidistant from the zero calibration for threadedly receiving gauge pins 73 having headed portions 74 to facilitate threading of the pins in the table.

Further equipment provided for determining the turning radius of vehicle wheels includes a bar 75 having a bearing portion 76 secured by a set screw 77 to an extension stud 78 which in turn is fastened by a collar 79 to the spindle of the rear axle of the vehicle in exactly the same manner as the collar 53 previously described. The bar 75 is provided with gauge pins 80 adjustably threaded into the bar at points spaced from the center of the bearing portion a distance equal to the radius of the wheel including the tire, and may serve for checking the transverse relation of the wheel to the wheel spindle as later described.

An upward projection 82 is fixed to the bar directly above the bearing portion and in central alignment therewith and is provided in its upper end with a slot 83 for seating the web 84 of a gauge bar 85 preferably T-shaped in cross section and of sufficient length to extend from the rear wheel to and over the table 66 to serve as a straight edge for aligning the table parallel to a longitudinal line extending from the center of the rear axle to the center of the front axle spindle. The bottom of the slot 83 in the projection 82 should be the same height above the axis of the rear wheel as the top of the table 66 is above the axis of the front wheel spindle.

A final element devised for use in making the first or turning radius test comprises a substantially perpendicular gauge rod 86 secured by a suitable clamp 87 to a front fender 88 of the vehicle and positioned perpendicularly to the straight edge 85. The lower end of the rod is preferably reduced in diameter as shown at 89 and may be provided with a handle 90 to facilitate moving the rod for adjustments.

The second test ordinarily made in aligning vehicle wheels is to determine their caster angle and the mechanism for accomplishing this purpose includes in addition to the table 66 previously described, a rail 92 preferably having a grooved lower face 93 for resting on the upper ends of the gauge pins 73 secured in the arcuate plate.

A bracket arm 94 having a lateral base flange 95 for seating on the bar 92 is formed with an upwardly extending wing 96, the bracket and wing being respectively provided with transverse openings 97 and 98 on a central vertical line of the bracket arm.

Carried in the opening 97 is a shaft 99 for rotatably and concentrically mounting a gear segment 100 having gear teeth 102 in its upper edges. A pinion 103 in meshing relation with the rack is rotatably mounted on a shaft 104 fixed in the opening 98 of the bracket wing, the pinion having a reduced neck 105 whereon is clamped, by a screw 106 or the like, an indicator 107 cooperative with a dial 108 integral with and offset from a supporting bar 109 having openings 110 and 112 for respectively receiving the shafts 99 and 104. As will be apparent, the supporting bar 109 and the bracket arm 94 may be fixed to the shafts 99 and 104 by keys 113 or the like for operably retaining the gear segment and pinion in assembled relation with the bracket arm.

Figure 5:
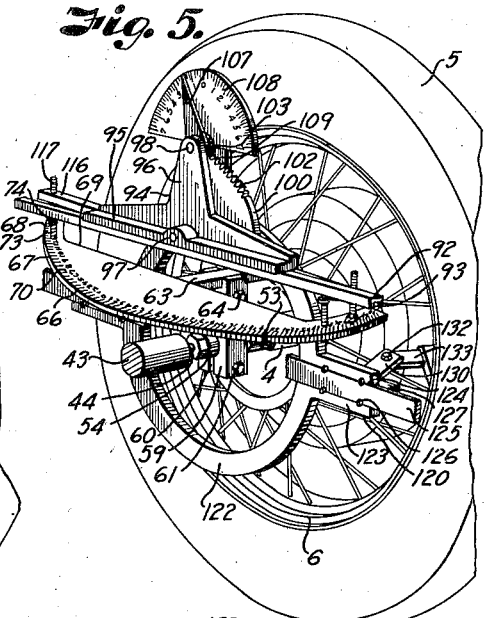
Fig. 5 is a similar perspective view showing the final position of the members when determining the caster angle of the front axle.
Figure 6:
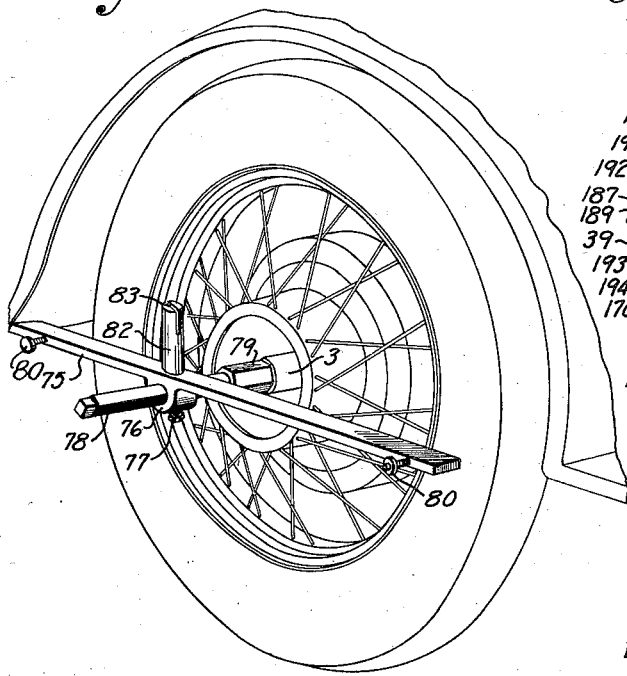
Fig. 6 is a perspective view of a rear wheel of a vehicle provided with a bracket for supporting the rear end of a gauge bar.
Figure 7:
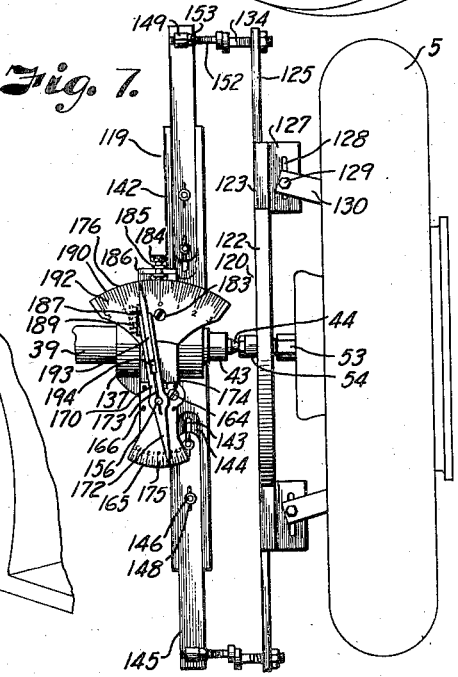
Fig. 7 is a front elevational view of a wheel aligning apparatus operably connected therewith for testing the toe-in and camber of the wheel.

Threaded into an opening 114 provided in the bearing portion of the gear segment 100 is a pivot pin or cap screw 115 for pivotally mounting a bar 116 cooperative with the bar 92 and of substantially the same length. The cooperating bar is provided adjacent to its ends with gauge pins 117 similar to the gauge pins 73 and adapted to rest on the extensions of the table as shown in Figs. 4 and 5.

The dial 108 is preferably semicircular in shape and is suitably calibrated for indicating the caster angle of a wheel tested with the foregoing mechanism in a manner later to be described.

For determining the pitch or camber of a vehicle wheel, I have provided a gauge mechanism 119 including a stationary gauge member or measuring bar 120 comprising an annular mounting member 122 having lateral arms 123 provided with longitudinal seats 124 for adjustably receiving bars or measuring arms 125 held in the seats by means such as the heads of screws 126.

Fixed to or formed integrally with the arms of the mounting member are lateral lugs 127 having elongated openings 128 for receiving bolts 129 extended transversely through the openings and through one end of links 130 having opposite ends pivotally connected by bolts 132 to clamps or anchors 133 constructed of any suitable shape for lockingly engaging a wheel rim.

As will be evident, the mounting member should be secured to a wheel rim in concentric relation therewith and, in order to facilitate adjustment of the measuring arms 125 to correspond to the diameter of a wheel, gauge points 134 are adjustably mounted in the arms and a cooperating gauge or stop 135 is preferably clamped on the longitudinal bar 18 and is graduated and numbered as indicated at 136 to correspond with the diameters of various standard sized tires so that by noting the size designated on a tire the arm may be adjusted to bring the gauge point into alignment with corresponding indicia on the gauge, the object of which will later be disclosed.

Rotatably mounted on the sleeve 42 and located near the inner end of the bearing portion 38 is a bearing bracket 137 comprising a part of the gauge mechanism 119 and provided with a flat face 138 having a threaded socket 139 centrally located therein to receive a cap screw 140 for clamping a movable gauge member or a pivoting arm 142 to the bracket.

The arm is preferably provided with elongated openings 143 and with related recessed portions 144 of increased width to seat extension members 145 adjustably secured to the arm by bolts 146 extending through the elongated openings and through apertures 147 in the extension members, wing nuts 148 being threaded on the bolts to facilitate adjustment of the extensions relative to the arm. Formed on the extreme outer ends of each extension is a post 149 having a transverse internally threaded opening 150 for receiving a tram or gauge point 152 locked in adjusted position in the post by a lock nut 153, the length of the arms being determined by the gauge 135 in the same manner as explained for adjusting the extensions 129.

It will thus be obvious that the gauge points in the extensions 145 are adapted to abut the points 134 in the members 125 when the bearing bracket is moved longitudinally on the support 39 toward the vehicle wheel and because of the pivotal connection between the arm 142 and the bearing bracket, the arm will pivot on the bracket in corresponding parallel relation to the members 125 provided the gauge points are adjusted evenly in their respective extensions.

In order to accurately determine the angular relation between the wheel spindle and the base line extending through the central termini of the spindles, an elongated side or extension wall 154 parallel to and opposite the face 138 is formed on the bearing bracket for supporting gauging mechanism and is provided with a bearing opening 155 for rotatably receiving a shaft 156 carrying a pinion 157 on its lower end which in turn is meshed with an idler pinion 158 fixed on the lower end of a shaft 159 rotatably mounted in an opening 160 adjacent and parallel to the bearing opening 155. A helical spring 161 is mounted on the shaft 156 with its opposite ends respectively anchored to the pinion 157 and to the bearing bracket to eliminate back lash between the pinions and a gear segment 162 formed on the upper face of the arm 142 for meshing engagement with the idler pinion and having an arcuate inner edge 163 adapted to engage and serve as a bearing for the outer periphery of the bearing bracket. The pinion 157 of less width than the idler pinion and meshing with only the upper portion thereof is thus prevented from engaging the teeth of the gear segment.

The upper end of the shaft 159 is counterbored and internally threaded for receiving a cap screw 164 to secure the shaft to the bearing bracket and a dial plate 165 is fixed to the wall 154 of the bracket by screws or the like 166 and is further provided with an opening 167 of sufficient diameter to receive the head of the cap screw to avoid the presence of projections on the outer face of the dial. Another aperture 168 aligned with the bearing opening 155 is of sufficiently large diameter to snugly receive a depending boss 169 formed on an indicater 170 having a hand 172, the indicator being preferably slit longitudinally as shown at 173 and being clamped on the shaft 156 by a screw 174.

While the gauging apparatus thus far described will serve to indicate in degrees, by means of graduations 175 on the dial, the amount of camber or toe-in of a wheel it is desirable to also determine such angularity in inches since the factory specifications are commonly given in inches and for this reason I have provided further indicating means including a second dial 176 located on the end of the extension wall opposite the dial 165 and having edge flanges 177 for slidably engaging T-sots 178 formed in a recessed track 179 of the extension wall.

A socket 180 formed in the base of the recess is provided to receive a nut 182 secured by means such as a cap screw 183 to the inner face of the second dial and an adjusting bolt 184 threaded into the nut is held against longitudinal movement in the socket by spaced collars 185 engaging opposite faces of a keeper plate 186 fixed to the corresponding end of the bearing bracket.

Thus by rotating the adjusting bolt, the second dial may be moved outwardly from the bearing bracket to correspond to variations in the diameters of vehicle wheels, a slot 187 of the second dial cooperating with a gauge point 188 fixed on the face of the elongated wall and slidable in the slot to indicate, by means of indicia 189 provided on the second dial along opposite sides of the slot, the respective diameter of a wheel.

The second dial is further provided along its arcuate outer edge 190 with calibrations 192 and a needle 193 adjustably and frictionally retained in a groove 194 of the indicator 170 extends in a direction opposite to the hand 172 for cooperating with said calibrations to designate the inches or portions thereof of the amount of toe-in or camber of a wheel.

Assuming apparatus to be constructed as described, the procedure for making the several tests to ascertain the aligning relation of wheels and axles is as follows:

To test the accuracy of the turning radius of the front wheels it is necessary to first adjust the arcuate table to a common center with the axis of the king or steering knuckle pin connecting the wheel spindle with the axle whereupon the clamping bolt 61 is loosened so that the bracket 59 can be turned on the extension stud. A bar 75 is then secured in operable position to the spindle of a complementary rear axle as clearly shown in Fig. 3 and a rail or straight edge is mounted in the notch of the projecting stud on said bar with its forward end resting flatly on the table 66. The clamping bolt is next tightened to secure the table in fixed relation on the extension stud and the straight edge is removed.

The gauge rod 86 is thereafter secured by means of its bracket to the front fender of the vehicle and in perpendicular relation to the table with its lower reduced end located directly above the center of the zero indicia on the table, it being of course necessary, when thus positioning the gauge rod, to have the front and rear wheels in direct alignment.

By then turning the steering wheel in one direction to its limit and noting the indicia of the table aligning with the gauge rod 86, the turning radius in one direction can be ascertained and by moving the steering wheel to its limit in the opposite direction the consequent turning radius can likewise be determined, the relative turning radii of the wheels, if correctly adjusted, being the same.

For determining the caster angle of a wheel the steering wheel is again turned in one direction until one of the tram points 73 registers with the gauge rod 86. This tram point is next adjusted in the table to a height corresponding to the lower end of the rod, whereupon the steering wheel is turned in a reverse direction and the other tram point is adjusted in like manner relative to the end of the gauge rod. Care should be exercised to thereafter avoid disturbing the adjustment of the tram points.

The grooved bar 92 is next positioned on the spaced points 73 as shown in Fig. 4 and the bracket arm with its associated bar 116 is mounted on the grooved bar. The downwardly extending tram points 117 of the cooperating bar are then adjusted with relation to the table until the indicator 107 is located in central position over the dial 108 at which point the bars will be parallel to each other.

The bracket arm with its entire assembly is next raised from the grooved bar and the cooperating bar 116 is turned 180 degrees whereupon the assembly is again placed on the grooved bar and assumes a position similar to that disclosed in Fig. 5 to accurately indicate the caster angle of the king pin and wheel connected with the pin, by means of the wheel or steering knuckle spindle. In order to obtain readings with a greater degree of accuracy, it is desirable to remove the weight of the vehicle from the front wheels while making the above tests.

When preparing to ascertain the amount of camber or pitch of a wheel the front axle of the vehicle is preferably elevated above the floor and the front wheels are mounted on suitable supporting blocks to provide greater working clearance, it being desirable to have the weight of the front end of the vehicle rest on the wheels so that normal position of the wheels relative to the axle will be assured.

The measuring bar or stationary gauge member 120 is rigidly clamped to a wheel rim and the position of the gauge points are checked with the stop 135, so that the gauge points indicate a plane at right angles to the axis of the wheel spindles. Each arm is then adjusted longitudinally to align its gauge point with the number on the gauge or stop corresponding to the diameter of the wheel indicated by the numerals printed on the tire.

Thereafter the movable gauge member 142 is turned on its support to successively align the gauge points of its arms with the stop 135 for lateral adjustment of its points to abut the stop to indicate a plane at right angles to the base line and for longitudinal adjustment of its arms to correspond in length to the arms 125. By turning the gauge members to a vertical position and sliding the movable gauge member longitudinally on the supporting sleeve until its pair of gauge points abut the pair of points on the stationary gauge member, the angular relationship between said plane which is the amount of camber or pitch will be instantly indicated in both degrees and inches on the respective dials at the ends of the bearing bracket.

It will be apparent that in order to determine the amount of toe-in of the wheel, it is necessary only to rotate the wheel 90 degrees and to thereafter rotate the arm 142 the same number of degrees and move it into abutment with the gauge points of the measuring bar 120 which will result in movement of the indicator over the dial in exactly the same manner as when testing the wheel camber.

From the foregoing, it will be apparent that each operation necessary for determining the several relative positions of the front wheels can be made without disassembling any member of the aligning machine from the supporting frame, thereby materially reducing the amount of time, as well as the effort required for making the necessary tests.

It should be noted that the dolly with its longitudinal support and trunnion bars may be positioned to the front or rear of either the front or rear wheels of a vehicle.

By applying the machine to the rear wheel axle shafts the rear wheels can be checked for parallelism to each other with the same mechanism used for checking the camber or toe-in of the front wheels.

Since all gauging is done mechanically no levelled floor is required to obtain accurate gauging nor is it necessary to use plumbs or levels on or with the aligning machine. Furthermore, wheels, rims, hub or tires that are "out of true" cannot affect the accuracy of the gauging mechanisms for the reason that these mechanisms are operably connected with the wheel spindles.

What I claim and desire to secure by Letters Patent is:

1. In an apparatus for determining angularity of the wheel spindles of a vehicle, a pair of trunnions, means for supporting the trunnions in alignment with the central termini of the spindles to establish a base line from which angularity of the spindles is determined, a gauge bar, means supporting the gauge bar in fixed transverse relation on a wheel carried by one of the spindles, gauge points adjustably mounted on the ends of the gauge bar, a stop member on the first named supporting means, by which the gauge points are adjusted to indicate a plane at right angles to the axis of the wheel spindle, a gauge means mounted on the trunnion adjacent said gauge bar to indicate a plane at right angles to said base line, and means associated with said gauge means for indicating angular relationship of said planes.

2. In an apparatus for determining angularity of the wheel spindles of a vehicle, a pair of trunnions, means for supporting the trunnions in alignment with the central termini of said spindles to establish a base line from which angularity of said spindles is determined, a gauge bar, means supporting the gauge bar in fixed transverse relation on a wheel carried by one of the spindles, gauge points adjustably mounted on the ends of the gauge bar, a stop member on the trunnion supporting means by which the gauge points are adjusted to indicate a plane at right angles to the axis of the wheel spindles, a second gauge bar, means for mounting the second named gauge bar on the trunnion adjacent the first named gauge bar, gauge points adjustably mounted on the last named gauge bar for similarly indicating a plane at right angles to said base line, and means associated with one of said bars for indicating angular relationship of said planes.

3. In an apparatus for determining angularity of the wheel spindles of a vehicle, gauge means, means supporting the gauge means in fixed relation to one of said spindles for indicating a plane at right angles to the axis of said spindle, a dolly, a trunnion supporting member, means pivotally mounting the trunnion supporting member on the dolly, a pair of trunnions on said supporting member for engaging said spindles in alignment with the central termini of said spindles to establish a base line from which angularity of the spindles is determined, a second gauge means for normally indicating a plane at right angles to said base line, means for normally mounting said last named gauge means on the trunnion adjacent said first named gauge means whereby said gauge means is angularly movable from said normal position into contact with the first named gauge means, and means associated with the last named gauge means for indicating angularity of said movement and the angular relationship between said planes.

4. In an apparatus for determining angularity of the wheel spindles of a vehicle, a pair of trunnions, means for mounting the trunnions in alignment with the central termini of said spindles to establish a base line from which angularity of said spindles is measured, a gauge bar, means supporting the gauge bar in fixed transverse relation on a wheel carried by one of the spindles, a second gauge bar, a support for the second named gauge bar on the trunnion adjacent the first named gauge bar, a pair of gauge points for each bar, means mounting the gauge points on the respective bars for movement to indicate planes at right angles to the axis of said spindle and to the base line respectively and for spacing said points in correspondence to the diameter of a wheel on said spindle, a scale slidably mounted on the support for movement to and from said axial mounting to position the scale in corresponding relation to the diameter of said wheel, an adjustable indicator pivotally mounted on the support and movable over said scale, and means connecting said indicator with the last named gauge means for moving the indicator relatively to said scale to indicate angularity of movement of the last named gauge means on the scale in inches at the wheel circumference.

5. In an apparatus for determining angularity of the wheel spindles of a vehicle, a pair of trunnions, centering members yieldingly mounted in said trunnions, means for mounting the trunnions with the centering members engaging lathe centers in said spindles to establish a base line from which angularity of the spindles is determined, a gauge bar, means supporting the gauge bar in fixed transverse relation on a wheel carried by one of the spindles, gauge points adjustably mounted on the ends of the gauge bar to indicate a plane at right angles to the axis of the wheel spindles, a gauge means mounted on the trunnion adjacent said gauge to indicate a plane at right angles to said base line, and means associated with said gauge means for indicating angularity between said planes.

6. In an apparatus for determining angularity of the wheel spindles of a vehicle, gauge means, means supporting the gauge means in fixed relation to one of said spindles for indicating a plane at right angles to the axis of said spindle, a dolly, a trunnion supporting member, means yieldingly mounting the trunnion supporting member on the dolly, a pair of trunnions on said supporting member for engaging said spindles in alignment with the central termini of said spindle to establish a base line from which angularity of the spindles is determined, a second gauge means for normally indicating a plane at right angles to said base line, means for normally mounting said last named gauge means on the trunnion adjacent said first named gauge means whereby said gauge means is angularly movable from said normal position into contact with the first named gauge means, and means associated with the last named gauge means for indicating angularity of said movement and the angular relationship between said planes.

MICHAEL SCHMIDT.